Patented Aug. 26, 1947

2,426,308

UNITED STATES PATENT OFFICE 2,426,308

STROKE CONTROL FOR FREE-PISTON UNITS

Andrew Kalitinsky, Eagleville, Conn., assignor to United Aircraft Corporation, East Hartford, Conn., a corporation of Delaware Application July 23, 1943, Serial No. 495,919

7 Claims. (Cl. 230—56)

This invention relates to an aircraft power plant having a free-piston engine-and-compressor unit.

When a free-piston engine-and-compressor unit is designed for a gas of one density, the compressor chambers are improperly dimensioned for other densities. A compensation for this overdimensioning may be obtained by changing the operating conditions in the compressor as, by throttling the passage of air through the compressor or by adjusting the residual volume of the compressor. Either of these adjustments may affect the length of the piston stroke as well as the location of the stroke within the cylinder. One feature of this invention is an adjustment for maintaining the desired piston stroke in spite of the changes in the operating conditions of the compressor.

The compression stroke of the piston in a unit of this type is caused by the expansion of air compressed in the air spring during the power stroke. One form of control for the length of position of the piston stroke is provided by controlling the pressure in the air spring. A feature of this invention is the adjustment of the air spring pressure simultaneously with the adjustment which changes the operating conditions in the compressor.

In certain installations compensation for a change in the load on the compressor or a change in the altitude may be provided only by adjusting the pressure in the air spring and a further feature of the invention involves a control by which such adjustment may be obtained.

Other objects and advantages will be apparent from the specification and claims, and from the accompanying drawings which illustrate an embodiment of the invention.

Figure 1:
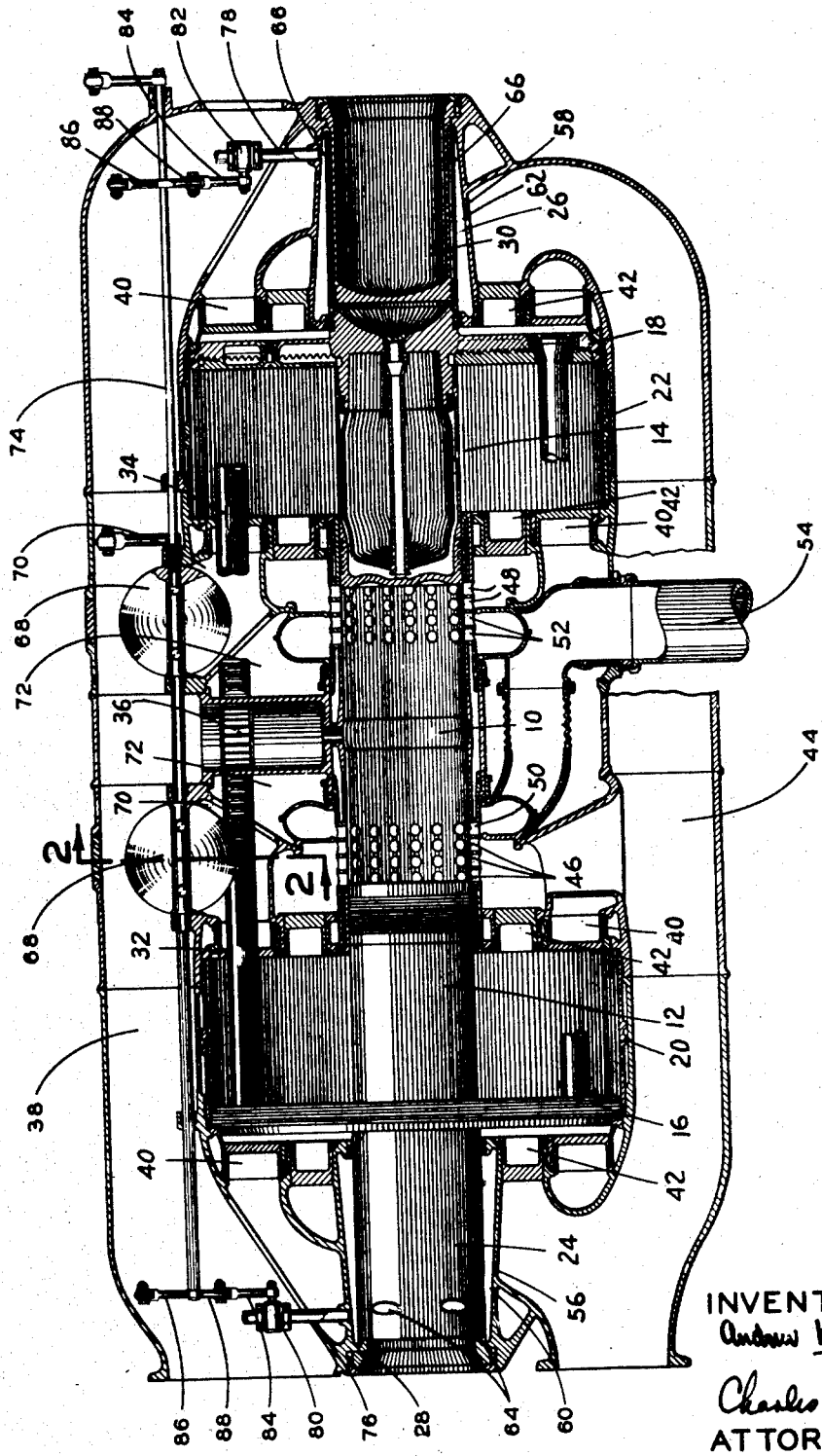
Fig. 1 is a sectional view of the free-piston engine-and-compressor.

The unit shown includes an engine cylinder 10 having reciprocating pistons 12 and 14 to which compressor pistons 16 and 18 in cylinders 20 and 22 are integrally connected. Sleeves 24 and 26 attached to the compressor pistons complete the reciprocating piston assemblies. The sleeves in combination with stationary pistons 28 and 30 form air spring cylinders.

The piston assemblies are moved apart by the burning of fuel injected into engine cylinder 10. Air compressed in the air spring cylinders on the power stroke returns the piston assemblies. The assemblies are always maintained at equal distances from the center of the engine cylinder by a linkage, which may include racks 32 and 34 extending from pistons 16 and 18 and meshing with opposite sides of a pinion 36.

Intake manifold 38 conducts air to intake valves 40 through which air alternately enters opposite ends of the compressor cylinders. The compressed air leaves the cylinders through discharge valves 42, also at opposite ends of the compressor cylinders, and passes through scavenge manifold 44 through ports 46 and 48 which are uncovered by pistons 12 and 14 at the end of the power stroke, thereby permitting air to be blown through the engine cylinder and exhaust ports 50 and 52 into exhaust manifold 54.

Pressure in the air springs may be maintained by connecting these air springs to the scavenge manifold. As shown, small ports 56 and 58 connect scavenge manifold 44 to chambers 60 and 62 surrounding air spring pistons 28 and 30. When the piston assemblies are adjacent the inner ends of their strokes, several ports 64 and 66 in air spring cylinders or sleeves 24 and 26 connect chambers 60 and 62 to the spaces at the heads of pistons 28 and 30.

Figure 2:
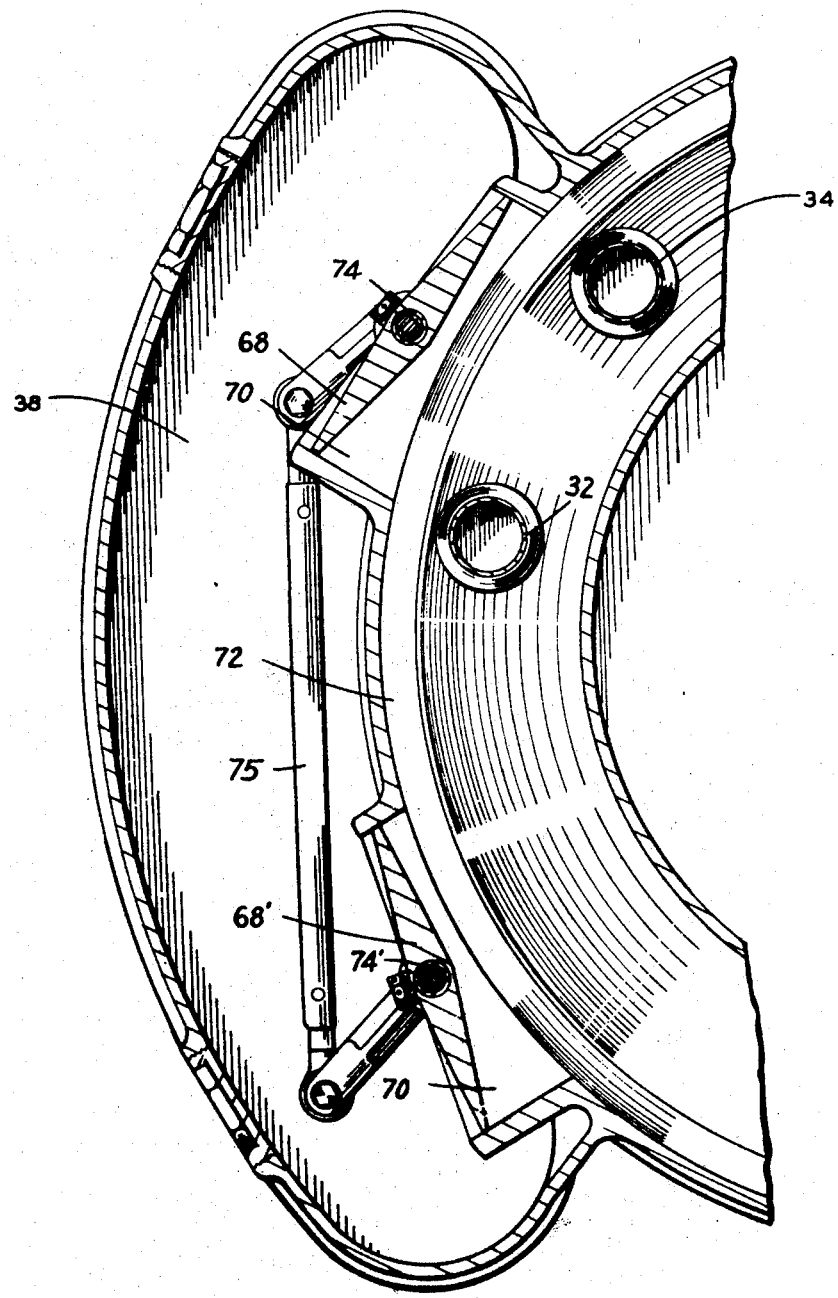
Fig. 2 is a sectional view substantially on line 2—2 of Fig. 1.

If the compressor is designed for operation at one altitude (for aircraft power plants), it may be adjusted for an increase in gas density (a lower altitude) by throttling the passage of gas through the compressor cylinder. Interconnected valves 68 and 68' (Fig. 2) are provided in the passages 70 leading from intake manifold 38 to the chamber 72 which communicates with intake valves 40 at the inner ends of the compressor cylinders. These valves are mounted on and may be controlled by a rod 74 projecting through an opening in manifold 38 and a parallel rod 74' connected to rod 70 by a linkage 75. By closing these valves by turning rod 74, pressure in the inner ends of the compressor cylinders is reduced, thus compensating for the increase in gas density, and permitting the piston stroke to remain approximately normal. Reduction of pressure in the compressor cylinders reduces the quantity of gas pumped by the compressor on each stroke, and thus changes an operating characteristic of the compressor.

When the compressor is throttled by valves 68, a change in the pressure in the air spring may be desirable. Since the inner ends of the compressors are throttled, the pressure in the air springs should be reduced. To accomplish this, conduits 76 and 78 connecting with chambers 60 and 62 have valves 80 and 82 controlled by the same rod 74 that controls the air valves 68. Each valve 80 or 82 is connected to rod 74 by arms 84 and 86 on valve stem and rod 74 respectively and a connecting link 88 extending between arms 84 and 86.

With the valve 68 mounted on rod 74, and the valves on a rod 74' parallel to it, and connected to it by a linkage, it will be apparent that turning of rod 74 by means of its projecting end will open or close all of the valves simultaneously. Since the valves 80 and 82 are also connected to the rod 74 by means of linkages the closing of valves 68 and 68' will simultaneously open the valves 80 and 82 for reducing the air spring pressure. It will be understood that the valves 68 and 68' may be partially closed or opened, with a correspondingly proportional opening or closing of valves 80 and 82. With this interconnection of the valves 68 and 68' with the valves 80 and 82 the adjustment of rod 72 will cause the proper change in air spring pressure to correspond to the change in throttling of the compressors.

Valves 80 and 82, which are normally closed, will, upon being opened, allow escape of gas to reduce the pressure in chambers 60 and 62. This results in a reduced pressure in these chambers and a corresponding drop in the air spring pressure. This reduced air spring pressure causes the stroke to be moved outwardly so that the engine ports may be fully uncovered by the piston at the outer end of its stroke.

Since valves 68, 80 and 82 are all connected to and operated by rod 74, movement of this rod procures a change in the operating conditions in compressors and air springs simultaneously.

It is to be understood that the invention is not limited to the specific embodiment herein illustrated and described, but may be used in other ways without departure from its spirit as defined by the following claims.

I claim:

1. In a free-piston engine-and-compressor unit, an engine cylinder, a free-piston movable therein, a compressor including a cylinder and piston, one of which is movable with the engine piston, an air spring comprising a cylinder and piston, one of which is movable with the engine piston, inlet and discharge valves at least at one end of the compressor, means for throttling the flow of air to the inlet valves and other means associated with said throttling means and movable simultaneously therewith for adjusting the minimum pressure in the air spring.

2. In a free-piston engine-and-compressor unit, an engine cylinder, a free-piston movable therein, a compressor including a cylinder and piston, one of which is movable with the engine piston, an air spring comprising a cylinder and piston, one of which is movable with the engine piston, inlet and discharge valves at least at one end of the compressor, and a single controlling means for simultaneously procuring a change in the minimum air pressure in the air spring and for throttling the flow of air to said inlet valve.

3. In a free-piston engine-and-compressor unit, an engine cylinder, a free-piston therein, a double acting compressor including a cylinder and piston, one of which is movable with the engine piston, said compressor cylinder having inlet and discharge valves at each end, an air spring including a cylinder and piston, one of which is movable with the engine piston, means for throttling the flow of air to the inlet valves at one end of the compressor cylinder, means for reducing the minimum pressure in the air spring and a single control means for actuating both the throttling means and the pressure reducing means simultaneously.

4. In a free-piston engine-and-compressor unit, an engine cylinder, a free-piston therein, a double acting compressor including a cylinder and piston, one of which is movable with the engine piston, said compressor cylinder having inlet and discharge valves at each end, an air spring including a cylinder and piston, one of which is movable with the engine piston, and a control means for procuring a throttling of the flow of air to the inlet valves at the end of the compressor cylinder adjacent to the engine cylinder and for procuring simultaneously a reduction in the minimum air spring pressure.

5. In a free-piston engine-and-compressor unit, an engine cylinder having scavenge and exhaust ports, opposed free-pistons therein adapted during their reciprocation to cover and uncover the ports, a compressor at each end of the engine cylinder, each compressor including a cylinder and piston, the latter being connected to and movable with the adjacent engine piston, said compressor cylinder having inlet and discharge valves at least at one end, and an air spring for each engine piston, in combination with means for simultaneously throttling the flow of air to the inlet valves and for adjusting the minimum pressure of the gas in the air springs.

6. In a free-piston engine-and-compressor unit, an engine cylinder having scavenge and exhaust ports, opposed free-pistons therein adapted during their reciprocation to cover and uncover the ports, a compressor at each end of the engine cylinder, each compressor including a cylinder and piston, the latter being connected to and movable with the adjacent engine piston, said compressor cylinder having inlet and discharge valves at least at one end, and an air spring for each engine piston, in combination with means for throttling the flow of air to said inlet valves, means for procuring a change in the minimum pressure in the air spring and a control means interconnecting said throttling means and said pressure adjusting means for actuating both of said means simultaneously.

7. In a free-piston engine-and-compressor unit, an engine cylinder having scavenge and exhaust ports, opposed free pistons therein adapted during their reciprocation to cover and uncover the ports, a compressor at each end of the engine cylinder, each compressor including a cylinder and pistons, the latter being connected to and movable with the adjacent engine piston, and an air spring for each engine piston, said compressor cylinders each having inlet and discharge valves at each end, in combination with means for throttling the flow of air to the inlet valves at the ends of the compressor cylinders adjacent to the engine cylinder, means for adjusting the minimum pressure in both of the air springs and means interconnecting said throttling means and said pressure adjusting means for actuating both of said means simultaneously.

ANDREW KALITINSKY.

REFERENCES CITED

The following references are of record in the file of this patent:

UNITED STATES PATENTS

| Number | Name | Date |
| --- | --- | --- |
| 2,189,497 | Pescara | Feb. 6, 1940 |
| 2,168,828 | Pescara | Aug. 8, 1939 |
| 2,025,177 | Pescara | Dec. 24, 1935 |
| 1,649,298 | Halleck | Nov. 15, 1927 |
| 2,170,358 | Wainwright | Aug. 22, 1939 |
| 2,038,442 | Pescara | Apr. 21, 1936 |
| 2,056,533 | Pescara | Oct. 6, 1936 |
| 2,064,976 | Janicke | Dec. 22, 1936 |
| 2,115,921 | Steiner | May 3, 1938 |
| 2,147,935 | Steiner | Feb. 21, 1939 |
| 2,168,828 | Pescara | Aug. 8, 1939 |
| 2,222,260 | Janicke | Nov. 19, 1940 |
| 1,732,693 | Pescara | Oct. 22, 1939 |
| 2,090,709 | Steiner | Aug. 24, 1937 |
| 2,139,425 | Steiner | Dec. 6, 1938 |
| 2,189,497 | Pescara | Feb. 6, 1940 |
| 2,222,260 | Janicke | Nov. 19, 1940 |